(12) United States Patent
Rimbault et al.

(10) Patent No.: US 10,118,839 B2
(45) Date of Patent: Nov. 6, 2018

(54) IRRADIATION ASSEMBLY FOR LIQUID PURIFICATION ASSEMBLY, PURIFICATION ASSEMBLY AND BEVERAGE DISPENSER

(71) Applicant: NESTEC S.A., Vevey (CH)

(72) Inventors: Celine Rimbault, Vittel (FR); Renaud Sublet, Vittel (FR)

(73) Assignee: Nestec S.A., Vevey (CH)

( * ) Notice: Subject to any disclaimer, the term of this patent is extended or adjusted under 35 U.S.C. 154(b) by 107 days.

(21) Appl. No.: 15/327,115

(22) PCT Filed: Jul. 9, 2015

(86) PCT No.: PCT/EP2015/065748
§ 371 (c)(1),
(2) Date: Jan. 18, 2017

(87) PCT Pub. No.: WO2016/008807
PCT Pub. Date: Jan. 21, 2016

(65) Prior Publication Data
US 2017/0166458 A1    Jun. 15, 2017

(30) Foreign Application Priority Data
Jul. 18, 2014    (EP) .................................... 14177694

(51) Int. Cl.
*C02F 1/32* (2006.01)
*A23L 3/28* (2006.01)
(Continued)

(52) U.S. Cl.
CPC ................ *C02F 1/325* (2013.01); *A23L 2/50* (2013.01); *A23L 3/28* (2013.01); *C02F 1/008* (2013.01);
(Continued)

(58) Field of Classification Search
CPC .... C02F 1/325; C02F 1/008; C02F 2201/005; C02F 2201/3222; C02F 2201/3227;
(Continued)

(56) References Cited

U.S. PATENT DOCUMENTS 3,904,363 A * 9/1975 Free ........................ C02F 1/325
250/431

FOREIGN PATENT DOCUMENTS

| CN | 203440122 | 2/2014 |
|----|-----------|--------|
| WO | 0170621 | 9/2001 |
| WO | 2010104096 | 9/2010 |

* cited by examiner

*Primary Examiner* — Walter D. Griffin
*Assistant Examiner* — Cameron J Allen
(74) *Attorney, Agent, or Firm* — K&L Gates LLP

(57) ABSTRACT

The invention relates to a liquid purification assembly using ultraviolet light irradiation against reproduction of pathogenic microorganisms, comprising an irradiation chamber (200) having an internal volume and comprising an inlet (204) and an outlet (205), the irradiation chamber (200) being provided with ultraviolet light emitting means (208) configured to irradiate liquid in the irradiation chamber (200) with ultraviolet light. The irradiation chamber (200) comprises a mechanism configured to cause a change in the internal volume of the irradiation chamber (200), said change in internal volume drawing liquid into the irradiation chamber (200) when the volume of the irradiation chamber (200) increases, and forcing liquid out of the irradiation chamber (200) when the volume of the irradiation chamber (200) decreases. The invention also relates to a beverage dispenser and to a method for purifying a liquid.

15 Claims, 3 Drawing Sheets

(51) Int. Cl.
*A23L 2/50* (2006.01)
*C02F 1/00* (2006.01)
*E03B 9/20* (2006.01)

(52) U.S. Cl.
CPC .. *C02F 2201/005* (2013.01); *C02F 2201/326* (2013.01); *C02F 2201/3222* (2013.01); *C02F 2201/3227* (2013.01); *C02F 2303/04* (2013.01); *C02F 2307/10* (2013.01); *E03B 9/20* (2013.01)

(58) Field of Classification Search
CPC ............ C02F 2201/326; C02F 2303/04; C02F 2307/10; C02F 1/32; A23L 3/28; A23L 2/50; E03B 9/20
See application file for complete search history.

IRRADIATION ASSEMBLY FOR LIQUID PURIFICATION ASSEMBLY, PURIFICATION ASSEMBLY AND BEVERAGE DISPENSER

CROSS REFERENCE TO RELATED APPLICATIONS

The present application is a National Stage of International Application No. PCT/EP2015/065748, filed on Jul. 9, 2015, which claims priority to European Patent Application No. 14177694.8, filed Jul. 18, 2014, the entire contents of which are being incorporated herein by reference.

FIELD OF THE INVENTION

The invention relates to an irradiation assembly for a liquid purification apparatus, using ultraviolet irradiation against the reproduction of pathogenic microorganisms. In particular, the invention relates to an irradiation chamber for a small liquid purification apparatus and to a beverage dispenser comprising such a liquid purification apparatus, for example a water fountain.

BACKGROUND OF THE INVENTION

The present invention relates generally to purification apparatuses comprising an irradiation chamber for liquid purification. The present invention relates in particular to a liquid purification assembly, to a beverage dispenser comprising such a purification apparatus, and to a method for purifying a liquid.

One of the most essential tasks in purifying liquids such as water for drinking is disinfection, so as to ensure that any pathogenic microorganisms (e.g. bacteria, viruses, and protozoans) present in the water cannot cause illness in anyone who drinks it. It is known to perform this disinfection by the process of ultraviolet (UV) irradiation, where a volume of water being treated is bombarded with high-energy radiation in the form of UV light. The UV light damages the DNA and RNA of the pathogenic microorganisms, destroying their ability to reproduce and effectively neutralizing their ability to cause disease.

Since such systems use light to disinfect, their effectiveness is reduced on liquid which is not naturally clear or which has not been filtered to remove suspended solids. The scope of "purification," for the purposes of this document, should thus be understood as encompassing the disinfection of liquid in which turbidity is minimal.

Traditional UV liquid purification systems have employed gas-discharge lamps as UV sources, in particular mercury-vapor lamps. Recently, it has become more and more common to employ ultraviolet light-emitting diodes (UV-LEDs) as a source of ultraviolet light for irradiation. UV-LEDs have numerous advantageous aspects which makes them appealing for use in an ultraviolet liquid purification system, notably their compact size, robustness, and lack of toxic components such as the mercury vapor found in conventional lamps. The solid-state nature of UV-LEDs also enables them to be switched on and off instantly, a further advantage relative to conventional gas-discharge lamps.

There are several examples in the prior art of UV-LEDs being employed to purify a liquid by ultraviolet irradiation. For example, the document CN 202175579 describes an irradiation device in which a single tube is spiraled around an array of UV-LEDs, allowing a continuous treatment of liquid. The document DE102005057875 discloses a device for sterilization of sewage in small sewage treatment and purification plant with sequencing batch reactor method. However, in the disclosed device the treated water is pushed out of the device by untreated water, causing possible hydrodynamic difficulties such as the creation of short cuts and stagnation zones, so that the disclosed device cannot guarantee that all the water flowing through it is actually fully purified.

In a general manner, to ensure an efficient purification of the treated liquid, said liquid has to be irradiated by ultraviolet for a sufficient time. The known small purifications apparatuses (e.g. used in drinkable water fountains) commonly comprise an irradiation chamber where the liquid flow continuously when liquid is drawn from the purification apparatus.

The volume of the irradiation chamber reduces the average velocity of the liquid flowing in the irradiation chamber, thus enhancing the residence time of the liquid in said chamber, and so the irradiation time.

Typical irradiation chambers have substantially the shape of a cylinder, closed at each end by a straight wall.

However, in such liquid purification apparatuses, the irradiation time, which is an important factor in liquid purification by ultraviolet light irradiation, depends on the flow rate of the liquid in the irradiation chamber.

Indeed, the irradiation time is equal to the residence time in the irradiation chamber (assuming that the UV-LEDs are switched on), which depends on the flow rate. In particular in small purification apparatuses, a low flow rate of the liquid and a large number of ultraviolet sources are required.

Moreover, the when a fluid flows in the irradiation chamber, dead volumes (i.e. parts of the chamber where the fluid stagnates) and short cuts (streamline going directly from the inlet to the outlet of the irradiation chamber without being slowed) may exist. Dead volumes and short cuts reduce the disinfection efficiency of the irradiation chamber. Finally, in the purification apparatuses known in the state of the art, cross-contamination between treated and untreated liquid may occur, as the treated liquid is pushed out of the irradiation chamber by untreated liquid.

It is therefore an objective of the present invention to provide a liquid purification assembly using ultraviolet irradiation that solves or reduces at least one of the above mentioned drawbacks.

SUMMARY OF THE INVENTION

In a first aspect of the invention there is provided a liquid purification assembly using ultraviolet light irradiation against reproduction of pathogenic microorganisms, comprising an irradiation chamber having an internal volume and comprising an inlet and an outlet, the irradiation chamber being provided with ultraviolet light emitting means configured to irradiate liquid in the irradiation chamber with ultraviolet light. The irradiation chamber comprises a mechanism configured to cause a change in the internal volume of the irradiation chamber, said change in internal volume drawing liquid into the irradiation chamber when the volume of the irradiation chamber increases, and forcing liquid out of the irradiation chamber when the volume of the irradiation chamber decreases.

Using such an assembly, a liquid may be purified in a batch sequencing mode. As the treated liquid is not pushed out of the irradiation chamber by untreated liquid but instead by to a mechanism, the user may be certain that all the liquid is sufficiently treated, and that there is no cross-contamination between treated and untreated liquid. In addition, this makes possible to efficiently purify a precise quantity of liquid. Finally, this reduces the hydrodynamic issues which may exist in apparatuses performing a continuous purification.

The liquid purification assembly may also replace in some embodiments the circulating pump which is generally used in the purification apparatuses.

The liquid purification assembly may comprise a first one-way valve configured to allow liquid to flow through the inlet into the irradiation chamber, and a second one way valve configured to allow liquid to flow through the outlet out of the irradiation chamber.

In an embodiment of the invention, the liquid purification assembly comprises a cylinder closed by a wall at an end, and a mobile piston enclosed in said cylinder, the movement of the piston causing the change in inner volume of the irradiation chamber comprised between the piston and the wall closing an end of the cylinder.

In this embodiment, the inlet and the outlet may be situated on the wall closing an end of the cylinder. Alternatively, the inlet may be situated on the wall closing an end of the cylinder, and the outlet may be situated on the piston, the outlet may be situated on the wall closing an end of the cylinder, and the inlet may be situated on the piston. The inlet and the outlet may be situated upon the piston.

Ultraviolet light emitting means may be comprised on the piston. Ultraviolet light emitting means may be comprised upon the wall closing an end of the cylinder. In a variant of the invention in which the cylinder has a transparent side wall, ultraviolet light emitting means may be disposed upon said side wall.

In another embodiment of the invention, the liquid purification assembly according may comprise a deformable membrane forming a wall of the irradiation chamber, the deformation of said membrane causing the change in inner volume of the irradiation chamber.

The ultraviolet light emitting means may comprise or may be ultraviolet light-emitting diodes.

The liquid purification assembly may also comprise an electronic controller configured to control the volume of the irradiation chamber, and/or the lighting of the ultraviolet light emitting means.

The liquid purification assembly may also comprise at least a system for preventing contamination by air entering the assembly, chosen from among the following:
  a microfiltration of air before the inlet of the chamber;
  a loop of sterile air; and
  a flash heating system to sterilize and dry the chamber;

The invention also relates to a beverage dispenser such as a water fountain comprising a liquid purification assembly as above described, configured to purify the beverage before delivery by ultraviolet irradiation.

The invention also relates to a method for purifying a liquid comprising:
  providing a liquid purification assembly according to any one of claims 1 to 13, in which the irradiation chamber is at a minimal volume;
  increasing the volume of the irradiation chamber, thereby causing a decrease in pressure which draws liquid into the irradiation chamber through the inlet;
  irradiating the liquid contained in the irradiation chamber using the ultraviolet light emitting means, thereby purifying the liquid contained in the irradiation chamber;
  decreasing the volume of the irradiation chamber, thereby forcing purified liquid out of the irradiation chamber.

BRIEF DESCRIPTION OF THE DRAWINGS

Additional features and advantages of the present invention are described in, and will be apparent from, the description of the presently preferred embodiments which are set out below with reference to the drawings in which.

DETAILED DESCRIPTION OF THE INVENTION

For a complete understanding of the present invention and the advantages thereof, reference is made to the following detailed description of the invention.

The invention is further described with reference to the following examples. It will be appreciated that the invention as claimed is not intended to be limited in any way by these examples.

It should also be appreciated that various embodiments of the present invention can be combined with other embodiments of the invention and are merely illustrative of the specific ways to make and use the invention and do not limit the scope of the invention when taken into consideration with the claims and the following detailed description.

Figure 1:
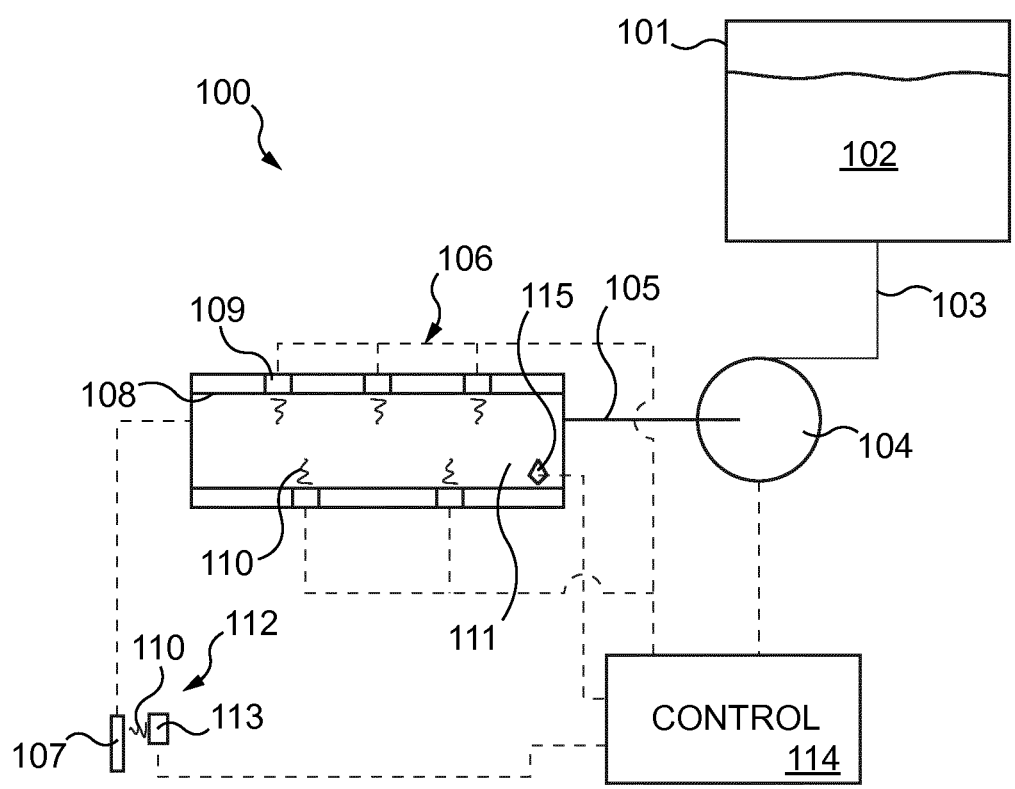
FIG. 1 is a schematic depiction of an example of a liquid purification apparatus comprising a liquid purification apparatus comprising an irradiation chamber.

FIG. 1 is a schematic depiction of a liquid purification apparatus 100, in particular a liquid purification apparatus comprised in a beverage dispenser such as a water fountain, as known in the state of the art. The following description of a liquid purification apparatus relates to the general architecture of an example of such a liquid purification apparatus.

The liquid purification apparatus 100 is provided a reservoir 101 which contains a volume of liquid 102. In this embodiment the liquid 102 is water, but may optionally be any liquid of sufficient transparency. The liquid 102 is drawn from the reservoir 101 through the pump tube 103 and into the pump 104. From the pump 104, the liquid 102 is conducted into the circulation tube 105.

The circulation tube 105 extends from the pump 104 through the irradiation device 106, as shown, establishing fluid communication between the pump 104 and the discharge port 107 of the purification apparatus.

In the irradiation device 106, the liquid is purified by UV irradiation. In the represented embodiment, the irradiation device 106 comprises a tubular structure, with an internal surface 108. The internal surface 108 is reflective, being fabricated preferably from a highly-polished metal or alternately covered with a reflective metal foil. The A plurality of primary ultraviolet light-emitting diodes (UV-LEDs) 109 is provided upon the interior surface 108 of said primary irradiation device 106 so that they project the ultraviolet radiation 110 inside an irradiation chamber 111.

The irradiation chamber comprises an inlet at one end, and an outlet at its other end.

After having been irradiated and thus disinfected in the irradiation chamber 111, the liquid 102 flows to the discharge port 107 and is discharged from the apparatus 100.

Optionally, the purification apparatus may be further provided with a secondary irradiation device 112 comprising at least one secondary UV-LED 113. The secondary irradiation device 112 projects ultraviolet rays 110 on the discharge port 107, for sterilizing the discharged fluid.

The output and number of UV-LEDs 109, 113 disposed in the primary and secondary irradiation devices 106 and 112 may vary according to the particular characteristics of the apparatus 100 and the application in which it is to be employed.

In the represented embodiment, the apparatus 100 further comprises a control means 114, which is configured to electrically control the operation of the primary and secondary irradiation means 106 and 112 and the pump 104. Preferably, the control means 114 also communicates with a photosensor 115 disposed within the primary irradiation device 106. The control means 114 uses the output of the photosensor 115 to calibrate the intensity of the ultraviolet radiation 110 emitted from the primary UV-LEDs 109, as well as to monitor the operation of the apparatus 100 and warn the user of any malfunctions.

While the apparatus discussed herein employs a photosensor 115, it should be understood that an apparatus 100 may be configured with other sensors (e.g. flow meters, water clarity sensors, thermocouples, etc.) which communicate with the control means 114 and which permit it to continually adjust the parameters of the operation of the liquid purification means. The exact configuration and program of operation of the control means 114 will thus vary according to the application in which the liquid purification device is to be employed.

Figure 2:
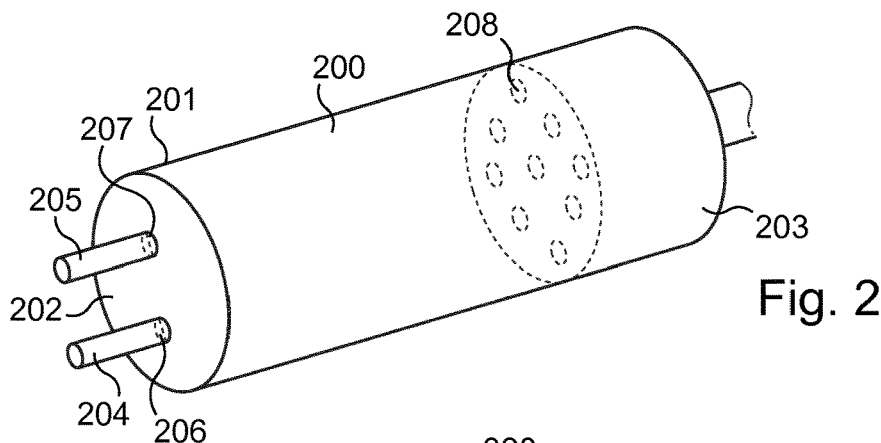
FIG. 2 is schematic depiction of a liquid purification assembly according to an embodiment of the invention.

FIG. 2 is schematic depiction of a liquid purification assembly according to an embodiment of the invention. The purification assembly substantially corresponds to the purification device 106 as represented in FIG. 1. In some applications, it may also replace the pump 104. The represented liquid purification assembly comprises an irradiation chamber 200. A mechanism is provided to cause a change in the internal volume of the irradiation chamber. In the represented example, the liquid purification assembly comprises a cylinder closed by a wall 202 at an end. A piston 203 in enclosed in said cylinder. The piston 203 is mobile, and may be translated in the cylinder 201. The movement of the piston 203 causes a change in inner volume of the irradiation chamber 200 which is (in this embodiment of the invention) comprised between the piston 203 and the wall 202. The piston may be actuated by an actuator (not shown), e.g. an electric or hydraulic actuator. The movement of the piston may be controlled (via a control of the actuator) by a controller, for example a controller similar to the controller 114 represented in FIG. 1 or another dedicated controller. The controller may command any variation in volume of the chamber, up to the maximum volume of the irradiation chamber 200. The controller may be configured to command a certain number of predefined volume variations. The purification assembly thereby makes it possible to purify a precise quantity of liquid. The whole quantity of liquid drawn into the irradiation chamber and defined by the variation of volume of the same, is efficiently irradiated during a given irradiation time.

The irradiation chamber comprises an inlet 204 and an outlet 205. The liquid to be disinfected may flow into the irradiation chamber by the inlet 204, and flow out of the irradiation chamber by the outlet 205. To ensure this flow direction, in the represented example embodiment a first one-way valve 206 is configured to allow liquid to flow through the inlet 204 into the irradiation chamber, and a second one way valve 207 is configured to allow liquid to flow through the outlet 205 out of the irradiation chamber. The one way valves may be passive, i.e. opened and closed by pressure differential across them. In other embodiments, the valves may be active, i.e. having piloted opening and closing. In such a case, solenoid vales may be used.

In the present exemplary embodiment, inlet and outlet are situated on the wall 202. Many other positions of the inlet 204 and outlet 205 are possible, as shown by way of examples in FIGS. 3, 4 and 5 and described hereafter.

The irradiation chamber 200 is provided with ultraviolet light emitting means 208. More particularly, in the present exemplary embodiment, the ultraviolet light emitting means 208 are ultraviolet light emitting diodes (UV-LEDs). The ultraviolet light emitting means 208 are adapted to emit ultraviolet light inside the irradiation chamber 200. In the represented example of embodiment, the UV-LEDs are situated upon the wall 202. Many other configurations of the UV-LEDs are possible, as shown by way of examples in FIGS. 3, 4 and 5 and described hereafter.

Figure 3:
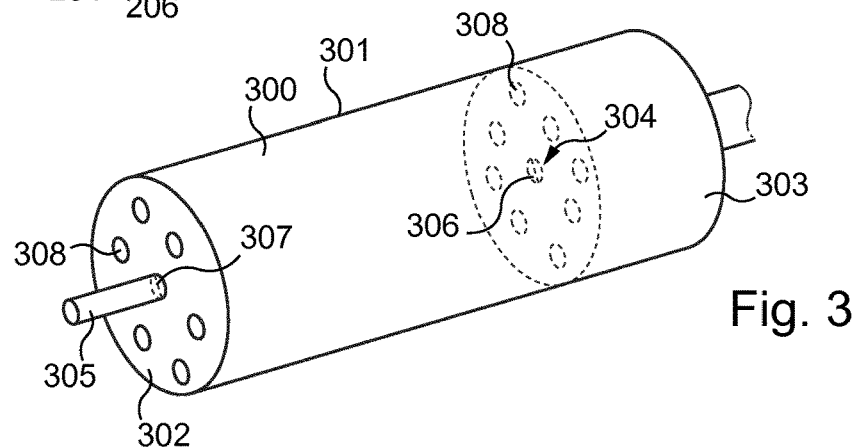
FIG. 3 is schematic depiction of a liquid purification assembly according to a first variant of the embodiment of FIG. 2.

FIG. 3 is schematic depiction of a liquid purification assembly according to a first variant of the embodiment of FIG. 2. More particularly, it illustrates a first possible variant in the position of the inlet, outlet, and ultraviolet light emitting means. The shown purification assembly has the same general structure as the purification assembly of FIG. 2. It comprises: an irradiation chamber 300, a cylinder 301 closed at one end by a wall 302, a mechanism comprising a piston 303. The inlet 304 is situated on the piston 303, and comprises the corresponding first one-way valve 306. The outlet 305 is situated on the wall 302, and comprises the corresponding second one-way valve 307. Ultraviolet light emitting means 308 are arranged upon the wall 302 and upon the piston 303.

Of course, in a variant having this configuration of ultraviolet light emitting means 308, the inlet 304 could be situated on the wall 302 and the outlet 305 on the piston 303, or the inlet 304 and the outlet 305 could be situated both on the wall 302, or both on the piston 303.

Figure 4:
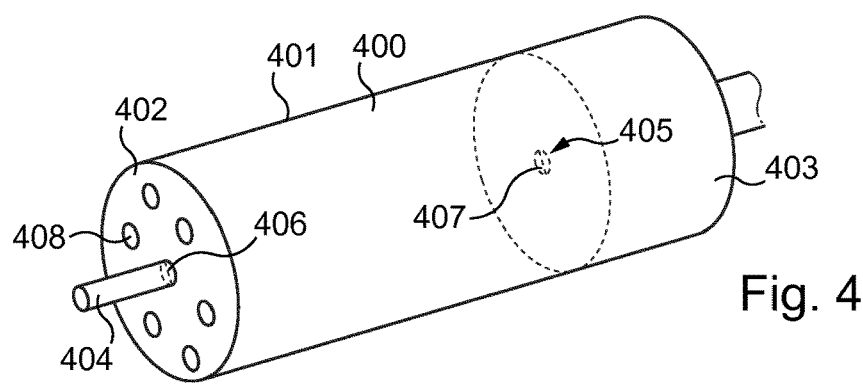
FIG. 4 is schematic depiction of a liquid purification assembly according to a second variant of the embodiment of FIG. 2.

FIG. 4 is schematic depiction of a liquid purification assembly according to a second variant of the embodiment of FIG. 2. More particularly, it illustrates a second possible variant in the position of the inlet, outlet, and ultraviolet light emitting means. The purification assembly shown here has the same general structure as the purification assembly of FIG. 2. It comprises: an irradiation chamber 400, a cylinder 401 closed at one end by a wall 402, and a mechanism comprising a piston 403. The inlet 404 is situated on the wall 402, and comprises the corresponding first one-way valve 406. The outlet 405 is situated on the piston 403, and comprises the corresponding second one-way valve 407. Ultraviolet light emitting means 408 are arranged upon the wall 402.

Of course, in a variant having this configuration of ultraviolet light emitting means 408, the inlet 404 could be situated on the piston 403 and the outlet 405 on the wall 402, or the inlet 404 and the outlet 405 could be situated both on the wall 402, or both on the piston 403.

Figure 5:
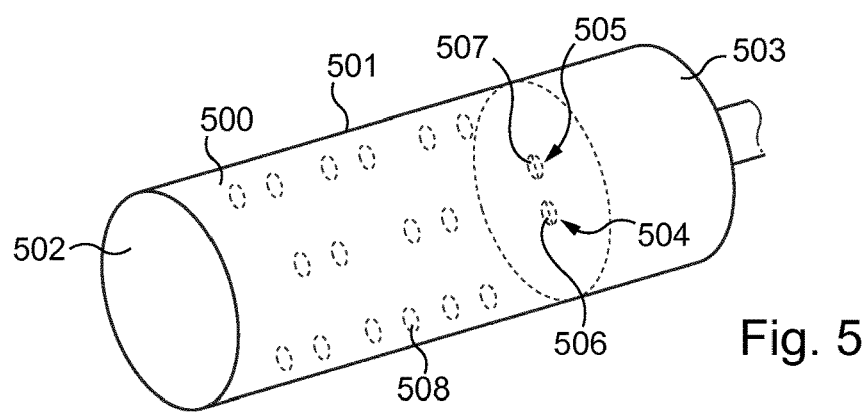
FIG. 5 is schematic depiction of a liquid purification assembly according to a third variant of the embodiment of FIG. 2.

FIG. 5 is schematic depiction of a liquid purification assembly according to a third variant of the embodiment of FIG. 2. More particularly, it illustrates a third possible variant in the position of the inlet, outlet, and ultraviolet light emitting means. The shown purification assembly has the same general structure as the purification assembly of FIG. 2. It comprises: an irradiation chamber 500, a cylinder 501 closed at one end by a wall 502, a mechanism comprising a piston 503. The inlet 504 is situated on the piston 503, and comprises the corresponding first one-way valve 506. The outlet 505 is also situated on the piston 503, and comprises the corresponding second one-way valve 507. Ultraviolet light emitting means 508 are arranged upon the cylinder 501.

Of course, in a variant having this configuration of ultraviolet light emitting means 508, the inlet 504 could be situated on the piston 503 and the outlet 505 on the wall 502, or the inlet 504 could be situated on the wall 502 and the outlet 505 on the piston 503, or the inlet 504 and the outlet 505 could be situated both on the wall 502.

Many other configurations of ultraviolet light emitting means are possible. In addition, the internal surface of the irradiation chamber may be coated with ultraviolet-reflective material, to improve the ultraviolet-light distribution.

According to a second aspect, the invention relates to a method for purifying a liquid. An example embodiment of this method is illustrated in FIG. 6.

Figure 6:
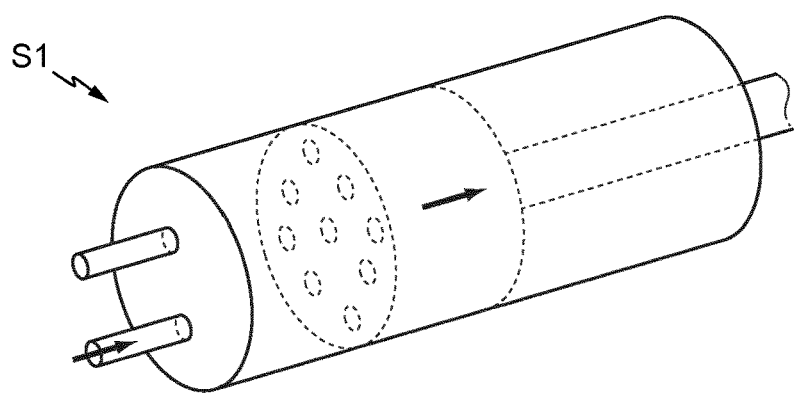
FIG. 6 schematically represents a method according to another aspect of the invention.
Figure 6:
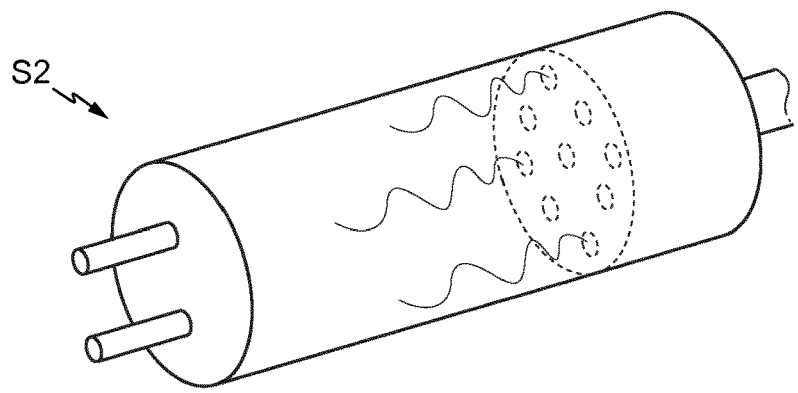
Figure 6:
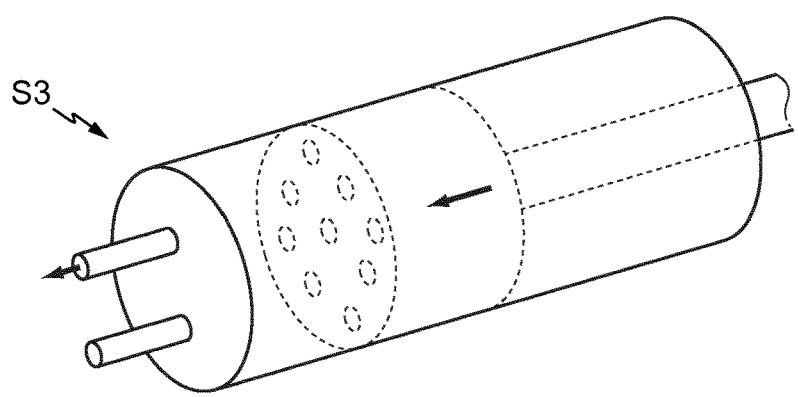

To implement the method described in reference to FIG. 6, a liquid purification assembly as previously described is provided. The method represented in FIG. 6 implements a liquid purification assembly as described in reference to FIG. 2.

However any other assembly according to the invention may be used.

The method starts with a filling step S1. At the beginning of the filling step S1, the irradiation chamber has a minimum volume. The minimum volume may be zero or near zero, or a certain small volume defined by a predetermined position of the piston (or any other mechanism) of the liquid purification assembly.

The volume of the irradiation chamber is progressively increased to a maximum volume (or to a predefined volume); the pressure in the irradiation chamber decreases, as a result this opens the first one-way valve at the inlet of the irradiation chamber, and draws liquid into the irradiation chamber.

When the irradiation chamber has reached a maximum volume, the ultraviolet-light emitting means are switched on in an irradiation step S2. The liquid which has been drawn into the chamber during the filing step S1. is disinfected by ultraviolet-light irradiation. In the represented embodiment of the method, the volume of the chamber does not change during the irradiation step. The liquid thereby does not circulate in the irradiation chamber during its purification.

After a predetermined time which depends on the quantity of liquid in the irradiation chamber and on the intensity of the ultraviolet-light emitted in said liquid, the liquid is deemed to be purified. In general, the greater the volume of liquid in the chamber, the greater the irradiation time.

In an emptying step S3, the volume of the irradiation chamber is decreased. The pressure in the irradiation chamber thereby increases, opening the first one-way valve at the outlet of the irradiation chamber and forcing purified liquid out of said chamber.

According to variant embodiments of the described method, the irradiation step S2 may overlap the filling step S1. and/or the emptying step S3. In other words, the ultraviolet light emitting means may be switched on during the filling step S1 and/or the emptying step S3. This increases the average irradiation time of the treated liquid.

In such a method, the liquid is purified in a batch sequencing mode. This makes possible to reduce the possible hydrodynamic issues of a continuous purification method (turbulences, dead volumes where the liquid stagnates, etc.). In addition, as the treated liquid is not pushed out of the irradiation chamber by untreated liquid but instead by a mechanism, the user may be certain that all the liquid is sufficiently treated, and that there is no cross-contamination between treated and untreated liquid.

As the liquid purification assembly according to the invention acts as a volumetric pump, it may in some embodiments replace the circulating pump which is used in some purification apparatuses.

As used in this specification, the words "comprises", "comprising", and similar words, are not to be interpreted in an exclusive or exhaustive sense. In other words, they are intended to mean "including, but not limited to".

Any reference to prior art documents in this specification is not to be considered an admission that such prior art is widely known or forms part of the common general knowledge in the field.

Although the invention has been described by way of example, it should be appreciated that variations and modifications may be made without departing from the scope of the invention as defined in the claims. For example, many known mechanisms may be contemplated to cause a variation in volume of the irradiation chamber. Furthermore, where known equivalents exist to specific features, such equivalents are incorporated as if specifically referred in this specification.

What is claimed is:

1. A liquid purification assembly using ultraviolet light irradiation against reproduction of pathogenic microorganisms, comprising an irradiation chamber having an internal volume and comprising an inlet and an outlet, the irradiation chamber being provided with an ultraviolet light emitting member configured to irradiate liquid in the irradiation chamber with ultraviolet light, the irradiation chamber comprises a mechanism configured to cause a change in the internal volume of the irradiation chamber, the change in internal volume drawing liquid into the irradiation chamber when the volume of the irradiation chamber increases, and forcing liquid out of the irradiation chamber when the volume of the irradiation chamber decreases.

2. A liquid purification assembly according to claim 1, comprising a first one-way valve configured to allow liquid to flow through the inlet into the irradiation chamber, and a second one-way valve configured to allow liquid to flow through the outlet out of the irradiation chamber.

3. A liquid purification assembly according to claim 1, comprising a cylinder closed by a wall at an end, and a mobile piston enclosed in the cylinder, the movement of the piston causing the change in inner volume of the irradiation chamber comprised between the piston and the wall closing an end of the cylinder.

4. A liquid purification assembly according to claim 3, wherein the inlet and the outlet are situated on the wall closing an end of the cylinder.

5. A liquid purification assembly according to claim 3, wherein the inlet is situated on the wall closing an end of the cylinder, and the outlet is situated on the piston, or the outlet is situated on the wall closing an end of the cylinder,and the inlet is situated on the piston.

6. A liquid purification assembly according to claim 3, wherein the inlet and the outlet are situated upon the piston.

7. A liquid purification assembly according to claim 3, wherein the ultraviolet light emitting member is on the piston.

8. A liquid purification assembly according to claim 3, wherein the ultraviolet light emitting member is on the wall closing an end of the cylinder.

9. A liquid purification assembly according to claim 3, wherein the cylinder has a transparent side wall, and the ultraviolet light emitting member is on the side wall.

10. A liquid purification assembly according to claim 1 comprising a deformable membrane forming a wall of the irradiation chamber, the deformation of the membrane causing the change in inner volume of the irradiation chamber.

11. A liquid purification assembly according to claim 1, wherein the ultraviolet light emitting member comprises ultraviolet light-emitting diodes.

12. A liquid purification assembly according to claim 1 comprising an electronic controller configured to control the volume of the irradiation chamber, and/or the lighting of the ultraviolet light emitting member.

13. A liquid purification assembly according to claim 1 comprising at least a system for preventing contamination by air entering the assembly, selected from the group consisting of:
 a microfiltration of air before the inlet of the chamber;
 a loop of sterile air; and
 a flash heating system to sterilize and dry the irradiation chamber.

14. A beverage dispenser comprising a liquid purification assembly using ultraviolet light irradiation against reproduction of pathogenic microorganisms, comprising an irradiation chamber having an internal volume and comprising an inlet and an outlet, the irradiation chamber being provided with an ultraviolet light emitting member configured to irradiate liquid in the irradiation chamber with ultraviolet light, the irradiation chamber comprises a mechanism configured to cause a change in the internal volume of the irradiation chamber, the change in internal volume drawing liquid into the irradiation chamber when the volume of the irradiation chamber increases, and forcing liquid out of the irradiation chamber when the volume of the irradiation chamber decreases, configured to purify the beverage before delivery by ultraviolet light irradiation.

15. A method for purifying a liquid comprising:
 providing a liquid purification assembly using ultraviolet light irradiation against reproduction of pathogenic microorganisms, comprising an irradiation chamber having an internal volume and comprising an inlet and an outlet, the irradiation chamber being provided with an ultraviolet light emitting member configured to irradiate liquid in the irradiation chamber with ultraviolet light,
 the irradiation chamber comprises a mechanism configured to cause a change in the internal volume of the irradiation chamber, the change in internal volume drawing liquid into the irradiation chamber when the volume of the irradiation chamber increases, and forcing liquid out of the irradiation chamber when the volume of the irradiation chamber decreases, in which the irradiation chamber is at a minimal volume;
 increasing the volume of the irradiation chamber, thereby causing a decrease in pressure which draws liquid into the irradiation chamber through the inlet;
 irradiating the liquid contained in the irradiation chamber using the ultraviolet light emitting member, thereby purifying the liquid contained in the irradiation chamber; and
 decreasing the volume of the irradiation chamber, thereby forcing purified liquid out of the irradiation chamber.

* * * * *